Patented Mar. 6, 1962

3,024,290
PROCESS FOR REPLACING VINYLIC
HALOGENS WITH FLUORINE
Albert L. Henne, Columbus, Ohio, assignor, by mesne assignments, to E. I. du Pont de Nemours and Company, Wilmington, Del., a corporation of Delaware
No Drawing. Filed Mar. 7, 1960, Ser. No. 12,970
14 Claims. (Cl. 260—648)

This invention relates to a fluorination process and more particularly to a process for replacing vinylic halogens with fluorine.

It is an object of the present invention to provide a process for replacing vinylic halogens with fluorine on an organic compound containing perfluoro groups attached to a vinyl halide group. Other objects will appear hereinafter.

These and other objects of this invention are accomplished by the process of substituting fluorine for at least one other halogen in a compound having the general structure

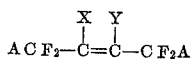

or

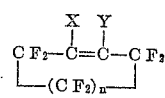

wherein X is chlorine, bromine or iodine; Y is chlorine, bromine, iodine, fluorine, hydrogen or a —CF$_3$ radical; A is either fluorine or a perfluoroalkyl radical; and $n$ is an integer including zero; which comprises heating said compound with an alkali metal fluoride in the presence of an inert organic carboxylic acid amide solvent or a dialkyl sulfoxide solvent at a temperature of from about 60 to 200° C.

The process of this invention is conveniently carried out in a pressure vessel since the reactants and/or products may be gases at the temperatures involved. Conventional steel, glass or glass-lined equipment is satisfactory. Since the alkali metal fluoride is a solid which may be incompletely soluble under the conditions of the reaction, agitation is normally used to provide for improved contact of the reactants.

The temperature at which the reaction takes place will vary with the specific compounds treated. Generally, a temperature of at least 60° C. is necessary. Temperatures above 200° C. are usually unnecessary. A preferred range is 70 to 160° C. Within this range, reaction takes place at reasonable speeds in good yield.

The compounds which may be used in the process of the present invention may be represented by the general structure

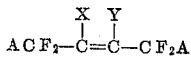

or

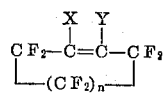

wherein X, Y, A and $n$ are as defined above. The perfluoroalkyl radical represented by A may have up to about twelve carbon atoms with the lower perfluoroalkyl radicals being preferred. The integer represented by $n$ may range from 0 to 10 with the preferred range being 0 to 2. These compounds may be characterized as having perfluoro groups attached to a vinyl halide group. Representative compounds include:

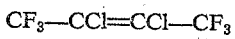

$CF_3$—$CF$=$CCl$—$CF_3$
$CF_3$—$CBr$=$CBr$—$CF_3$
$CF_3$—$CH$=$CCl$—$CF_3$
$CF_3$—$CH$=$CI$—$CF_3$
$CF_3$—$CH$=$CI$—$CF_2$—$CF_3$
$CF_3$—$CH$=$CBr$—$CF_3$

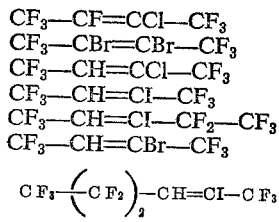

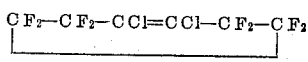

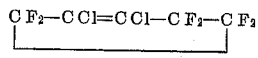

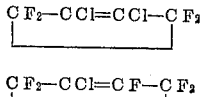

When both X and Y are halogen radicals other than fluorine in the compounds used as starting materials, the substitution appears to take place in two steps. One halogen is replaced until a major proportion of the starting material is converted and then the second halogen is replaced. In general, the replacement of the second halogen requires heating to a higher temperature than that of the first or a prolonged period of heating at the same temperature. The heating time is not critical and will vary with the particular alkali metal fluoride employed. Specific illustrations are given in the examples.

The reactants should be dry and the alkali metal fluoride should be finely powdered to expose a maximum surface for reaction. In order to replace all of the halogen an excess of metal fluoride is required. Preferably, at least 1.1 mole of alkali metal fluoride is used per halogen atom to be replaced. Greater excesses of alkali metal fluoride may be used, but amounts in excess of 2 moles of alkali metal fluoride per halogen to be replaced are usually not required.

The solvent used is an organic carboxylic acid amide or a dialkyl sulfoxide. The solvent must be inert, be a liquid at the temperature of reaction and must be stable under the conditions of reaction. Typical solvents are: formamide, acetamide, dimethylformamide, dimethyl acetamide, N-methylpyrrolidone, dimethyl sulfoxide, diethyl sulfoxide, etc. If desired, miscible hydrocarbons, such as xylene, may also be used in conjunction with these solvents. These hydrocarbons aid in dispersing the solids present in the reaction mass.

Any of the fluorides of the alkali metals, Li, Na, K, Cs, Rb, may be used. Of these, potassium fluoride is preferred because of its ready availability. Cesium fluoride, while more expensive, is more reactive and gives the same degree of conversion as potassium fluoride in about one-half the time, other factors being equal. Sodium fluoride is less reactive and requires more mechanical agitation to remove the coating of sodium chloride which forms on the surface. Lithium fluoride is similar.

The fluorinated olefines which are obtained by the process of this invention have a wide variety of uses. They may be further halogenated to yield compounds useful as heat transfer media and as dielectrics. In many cases, the compounds are useful as propellants and refrigerants, either alone or in combination with other fluorinated hydrocarbons such as difluorodichloromethane.

The following examples will better illustrate the nature of the present invention; however, the invention is not intended to be limited to these examples. Parts are by weight unless otherwise indicated.

Example 1

23.3 parts of 2,3-dichlorohexafluorobutene-2 ($CF_3$—$CCl=CClCF_3$), 23.2 parts of dry powdered potassium fluoride and 60 parts of dimethyl formamide were heated in a steel rocker bomb for 4 hours at 100° C. The bomb was then cooled. Analysis by chromatography and infrared showed the presence of major proportions of cis- and trans-$CF_3$—$CF=CCl$—$CF_3$. The bomb was then closed and heated to 100° C. The temperature was then raised progressively over a period of 6 hours to 160° C. The bomb was cooled and the contents fractionally distilled. A fraction of 12 parts was collected at 10° C. Chromatographic analysis showed two compounds. Infrared analysis gave a spectrum corresponding exactly with that for the known cis- and trans- mixture of the compound $CF_3$—$CF=CF$—$CF_3$. It is estimated that the cis:trans ratio was approximately 1:3.

Example 2

24.5 parts of 1,2-dichlorohexafluorocyclopentene

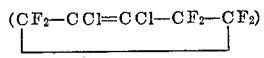
($CF_2$—$CCl=CCl$—$CF_2$—$CF_2$)

23.2 parts of potassium fluoride and 60 parts of dimethyl formamide were heated in a steel bomb at 90° C. for 5 hours. At the end of this time a chromatographic analysis showed that the starting material had been essentially all transformed to a mixture of

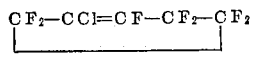
$CF_2$—$CCl=CF$—$CF_2$—$CF_2$ and

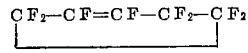
$CF_2$—$CF=CF$—$CF_2$—$CF_2$

The reaction temperature was then raised gradually to 140° C. over a period of 5 hours. The bomb was cooled and discharged. Chromatographic analysis showed only one peak corresponding to the perfluorocyclopentene. The contents of the bomb were distilled to give a fraction of 12.5 parts of perfluorocyclopentene boiling at 25–27° C. having a major infrared absorption peak at 5.85 microns.

Example 3

23 parts of 2,3-dichlorohexafluorobutene-2

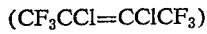
($CF_3CCl=CClCF_3$)

23.2 parts of potassium fluoride and 60 parts of dimethyl sulfoxide were heated in a steel bomb at 80° C. for 3 hours. Chromatographic analysis showed that the major products consisted of cis- and trans- $CF_3CF=CClCF_3$. The mixture was then heated an additional 6 hours at 160° C. Fractional distillation of the mass yielded 6.5 parts of $CF_3CF=CFCF_3$.

Example 4

(A) 19 parts of 1,2-dichlorotetrafluorocyclobutene

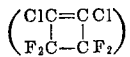
$\begin{pmatrix} ClC=CCl \\ | \quad | \\ F_2C-CF_2 \end{pmatrix}$ 23.2 parts of potassium fluoride and 60 parts of N-methyl pyrrolidone were heated in a steel bomb, while rocking, for 3 hours at 70° C. At the end of this time approximately half of the starting material had been converted to

$FC=CCl$
$|\quad|$
$F_2C-CF_2$

After a further 8 hours heating at 70° C. a major proportion had been transformed into

$FC=CF$
$|\quad|$
$F_2C-CF_2$

Some saturated by-product was also obtained due to the addition of HF to the double bond.

(B) Essentially the same results were obtained in a shorter time when the same quantities of materials were heated in a steel rocker bomb for 3 hours at 90° C., followed by 1 hour at 110° C., 1 hour at 130° C., and 1 hour at 150° C.

Example 5

23.3 parts of 2,3-dichlorohexafluorobutene-2, 61 parts of cesium fluoride and 120 parts of N-methyl-pyrrolidone were heated in a steel rocker bomb for 2 hours at 100° C. and then the temperature was gradually raised to 160° C. over a period of 3 hours. The contents of the bomb were fractionally distilled to yield approximately 12 parts of a mixture of cis- and trans- $CF_3CF=CFCF_3$ boiling at 10° C. The reaction was particularly clean, the reaction mass being essentially free of any decomposition products.

Example 6

23.3 parts of 2,3-dichlorohexafluorobutene-2, 17.6 parts of sodium fluoride and 60 parts of N-methyl-pyrrolidone were heated in a rocker bomb for 4 hours at 100° C. and then the temperature was progressively raised to 160° C. over a period of 6 hours. On distilling the contents of the bomb, a fraction of about 6 parts of a mixture of cis- and trans- $CF_3CF=CFCF_3$ was collected.

As many widely different embodiments of this invention may be made without departing from the spirit and scope thereof, it is to be understood that this invention is not limited to the specific embodiments thereof except as defined in the appended claims.

What is claimed is:

1. A process for substituting fluorine for at least one other halogen in an unsaturated compound selected from the group consisting of

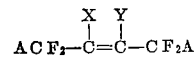
$$ACF_2-\underset{\underset{X}{|}}{C}=\underset{\underset{Y}{|}}{C}-CF_2A$$

and

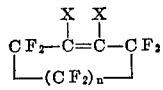
$$CF_2-\underset{\underset{X}{|}}{C}=\underset{\underset{X}{|}}{C}-CF_2$$
$$\underset{(CF_2)_n}{\underline{\qquad\qquad}}$$

wherein X is selected from the group consisting of chlorine, bromine and iodine; Y is selected from the group consisting of chlorine, bromine, iodine, fluorine, hydrogen and a —$CF_3$ radical; A is independently selected from the group consisting of fluorine and a perfluoroalkyl radical of up to about twelve carbon atoms and $n$ is an integer from zero to ten; which comprises heating said compound with an alkali metal fluoride in the presence of an inert solvent selected from the group consisting of an organic carboxylic acid amide and a dialkyl sulfoxide at a temperature of from about 60 to 200° C.

2. A process according to claim 1 wherein the unsaturated compound is 2,3-dichlorohexafluorobutene-2.

3. A process according to claim 1 wherein the unsaturated compound is 1,2-dichlorohexafluorocyclopentene.

4. A process according to claim 1 wherein the alkali metal fluoride is potassium fluoride.

5. A process according to claim 2 wherein the alkali metal fluoride is potassium fluoride.

6. A process according to claim 2 wherein the alkali metal fluoride is cesium fluoride.

7. A process according to claim 3 wherein the alkali metal fluoride is potassium fluoride.

8. A process according to claim 1 wherein the solvent is N-methylpyrrolidone.

9. A process according to claim 1 wherein the solvent is dimethyl formamide.

10. A process according to claim 5 wherein the solvent is N-methylpyrrolidone.

11. A process according to claim 5 wherein the solvent is dimethyl formamide.

12. A process according to claim 5 wherein the solvent is dimethyl sulfoxide.

13. A process according to claim 7 wherein the solvent is dimethyl formamide.

14. A process according to claim 1 wherein the reaction is carried out at a temperature of 70 to 160° C.

References Cited in the file of this patent

UNITED STATES PATENTS 2,842,603    Miller ------------------ July 8, 1958

UNITED STATES PATENT OFFICE
CERTIFICATE OF CORRECTION

Patent No. 3,024,290                        March 6, 1962

Albert L. Henne

It is hereby certified that error appears in the above numbered patent requiring correction and that the said Letters Patent should read as corrected below.

Column 4, lines 41 to 45, the formula should appear as shown below instead of as in the patent:

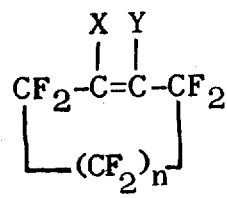

Signed and sealed this 17th day of July 1962.

(SEAL)
Attest:

ERNEST W. SWIDER
Attesting Officer

DAVID L. LADD
Commissioner of Patents

Notice of Adverse Decision in Interference

In Interference No. 93,920 involving Patent No. 3,024,290, A. L. Henne, PROCESS FOR REPLACING VINYLIC HALOGENS WITH FLUORINE, final judgment adverse to the patentee was rendered Aug. 25, 1965, as to claims 1, 2, 3, 4, 5, 7, 9, 11, 13 and 14.

[*Official Gazette December 14, 1965.*]